US011004325B2

(12) United States Patent
Lenchner et al.

(10) Patent No.: US 11,004,325 B2
(45) Date of Patent: May 11, 2021

(54) SMARTPHONE BASED REMINDING SYSTEM FOR FORGOTTEN OBJECTS

(71) Applicant: International Business Machines Corporation, Armonk, NY (US)

(72) Inventors: Jonathan Lenchner, North Salem, NY (US); Reha Yurdakul, Istanbul (TR); Komminist Weldemariam, Ottawa (CA)

(73) Assignee: International Business Machines Corporation, Armonk, NY (US)

( * ) Notice: Subject to any disclaimer, the term of this patent is extended or adjusted under 35 U.S.C. 154(b) by 10 days.

(21) Appl. No.: 16/584,836

(22) Filed: Sep. 26, 2019

(65) Prior Publication Data
US 2021/0097843 A1    Apr. 1, 2021

(51) Int. Cl.
| | |
|---|---|
| *G08B 21/24* | (2006.01) |
| *H04W 4/02* | (2018.01) |
| *H04W 4/021* | (2018.01) |
| *H04B 5/00* | (2006.01) |
| *H04W 4/80* | (2018.01) |

(52) U.S. Cl.
CPC ......... *G08B 21/24* (2013.01); *H04B 5/0025* (2013.01); *H04B 5/0062* (2013.01); *H04W 4/021* (2013.01); *H04W 4/023* (2013.01); *H04W 4/80* (2018.02)

(58) Field of Classification Search
None
See application file for complete search history.

(56) References Cited

U.S. PATENT DOCUMENTS

| | | | |
|---|---|---|---|
| 8,471,706 B2 | 6/2013 | Schuster | |
| 8,688,071 B1* | 4/2014 | Daly | H04W 4/90 455/404.2 |
| 9,368,020 B1* | 6/2016 | Bell | H02J 50/15 |
| 9,554,279 B1* | 1/2017 | Kremer | H04W 12/0802 |
| 9,826,398 B2* | 11/2017 | Chen | H04W 12/04031 |
| 2004/0174260 A1* | 9/2004 | Wagner | G06Q 10/08 340/568.1 |

(Continued)

FOREIGN PATENT DOCUMENTS

JP    2017051279    3/2017

OTHER PUBLICATIONS

Kai Hormann, Alexander Agathos, "The point in polygon problem for arbitrary polygons", University of Erlangen, Computer Graphics Group, Am Weichselgarten 9, 91058 Erlanger, Germany and University of Athens, Department of Informatics, Athens, Greece, Computational Geometry 20 (2001) 131-144.

*Primary Examiner* — Benyam Haile
*Assistant Examiner* — Muhammad Adnan
(74) *Attorney, Agent, or Firm* — Shimon Benjamin; Lou Percello, Attorney, PLLC

(57) ABSTRACT

A peripheral device, e.g. a smart phone, receives information defining a secured area perimeter of a secure area and a global positioning system (GPS) about the location of a user. The process compares the security perimeter to the position information to determine whether a user is within the secured area. If the user is outside the secured area and has not returned an access device, e.g. a badge, a temporary pass, etc., the peripheral device posts an alert to the user, e.g. a warning the user may have forgotten to return the access device/badge. Alerts can be posted or sent for other conditions as well.

14 Claims, 6 Drawing Sheets

(56) References Cited

U.S. PATENT DOCUMENTS

| | | | |
|---|---|---|---|
| 2006/0087410 A1* | 4/2006 | Garcia | G09F 3/207 340/309.16 |
| 2006/0270421 A1* | 11/2006 | Phillips | H04W 4/021 455/457 |
| 2010/0060452 A1* | 3/2010 | Schuster | G08B 13/2402 340/572.1 |
| 2011/0002480 A1* | 1/2011 | Smith | G08B 13/1672 381/104 |
| 2012/0214472 A1* | 8/2012 | Tadayon | H04M 3/53 455/418 |
| 2012/0242481 A1* | 9/2012 | Gernandt | G08B 21/0219 340/539.13 |
| 2012/0293330 A1* | 11/2012 | Grant | G08B 21/0266 340/568.8 |
| 2013/0257616 A1* | 10/2013 | Taylor | G08B 13/1445 340/568.2 |
| 2014/0061893 A1 | 3/2014 | Saeidi et al. | |
| 2015/0079970 A1* | 3/2015 | Delgado Campos | H04L 63/107 455/421 |
| 2016/0244311 A1* | 8/2016 | Burks | G06Q 30/0635 |
| 2017/0039784 A1* | 2/2017 | Gelbart | G07C 5/00 |
| 2017/0236407 A1* | 8/2017 | Rhoads | H04N 5/23219 455/420 |
| 2017/0372184 A1 | 12/2017 | Manci et al. | |
| 2018/0288673 A1* | 10/2018 | Henderson | H04W 48/16 |
| 2018/0322759 A1* | 11/2018 | Devdas | A61B 5/0024 |
| 2019/0045478 A1* | 2/2019 | Runyon | H04W 4/33 |
| 2019/0259267 A1* | 8/2019 | Sundermeyer | H04L 12/2818 |
| 2019/0286806 A1* | 9/2019 | Robinson | H04W 12/06 |
| 2019/0326015 A1* | 10/2019 | Cannell | G16H 40/67 |
| 2019/0371098 A1* | 12/2019 | Meadow | G01S 5/10 |

* cited by examiner

SMARTPHONE BASED REMINDING SYSTEM FOR FORGOTTEN OBJECTS

BACKGROUND

The present invention relates to a system and method using a smartphone for reminding a user about forgotten objects, and more specifically, to remind users to return forgotten visitor's badges.

When visiting a secured area, a visitor is often given an access device, e.g. a security or visitor's badge, that needs returning later. Sometimes the visitor is required to give some sort of identification or other surety to ensure the access device/badge is returned.

However, it is not uncommon to forget to return the visitor's badge. The problem is compounded when the surety is not returned to the visitor in exchange for returning the badge. For example, if the surety is a form of identification, possibly a passport, that is not returned to the visitor, the visitor potentially risks great inconvenience, e.g. arriving at an airport with no passport.

There is a need for a system that reminds users to return objects like security badges and re-acquire any surety that was given in exchange.

SUMMARY

According to one embodiment, the present invention is a peripheral device, e.g. a smartphone, with one or more memories, one or more central processing units (CPUs), and one or more user interfaces. The user interfaces can send and receive information. A process executes on the peripheral device. The process receives geometric information defining a secured area perimeter of a secure area through one or more of the user interfaces of the peripheral device. Typically, the geometric information is received one time. The peripheral device (process) also receives user position information from a global positioning system (GPS) through one of the peripheral device interfaces. The process compares the security perimeter to the position information to determine whether a user is within the secured area.

Using this information, the peripheral device can perform various functions. As an example, the device process provides/posts an alert to the user when the user is outside the secure area. Generally, the alert is posted only when the user still possesses (has not returned) an access device (e.g. a temporary pass, temporary identification, badge, radio frequency device, etc.) and the user is outside of the secured area, i.e. the user may have forgotten to return the access device/badge.

Various alert types are described. Conditions can also be provided to the device. For example, conditions might include one or more of the following: a security level for the secured area, a classification of the user, a time of allowed access to the secured area, and a date of allowed access to the secured area, etc. If one or more conditions is not met and the access device/badge is not returned, an alert can be sent or posted to the user.

A base station, systems, and methods are also disclosed.

BRIEF DESCRIPTION OF THE DRAWINGS

Various embodiments of the present invention will be described below in more detail, with reference to the accompanying drawings, now briefly described. The Figures show various apparatus, structures, and related method steps of the present invention.

DETAILED DESCRIPTION

Figure 1:
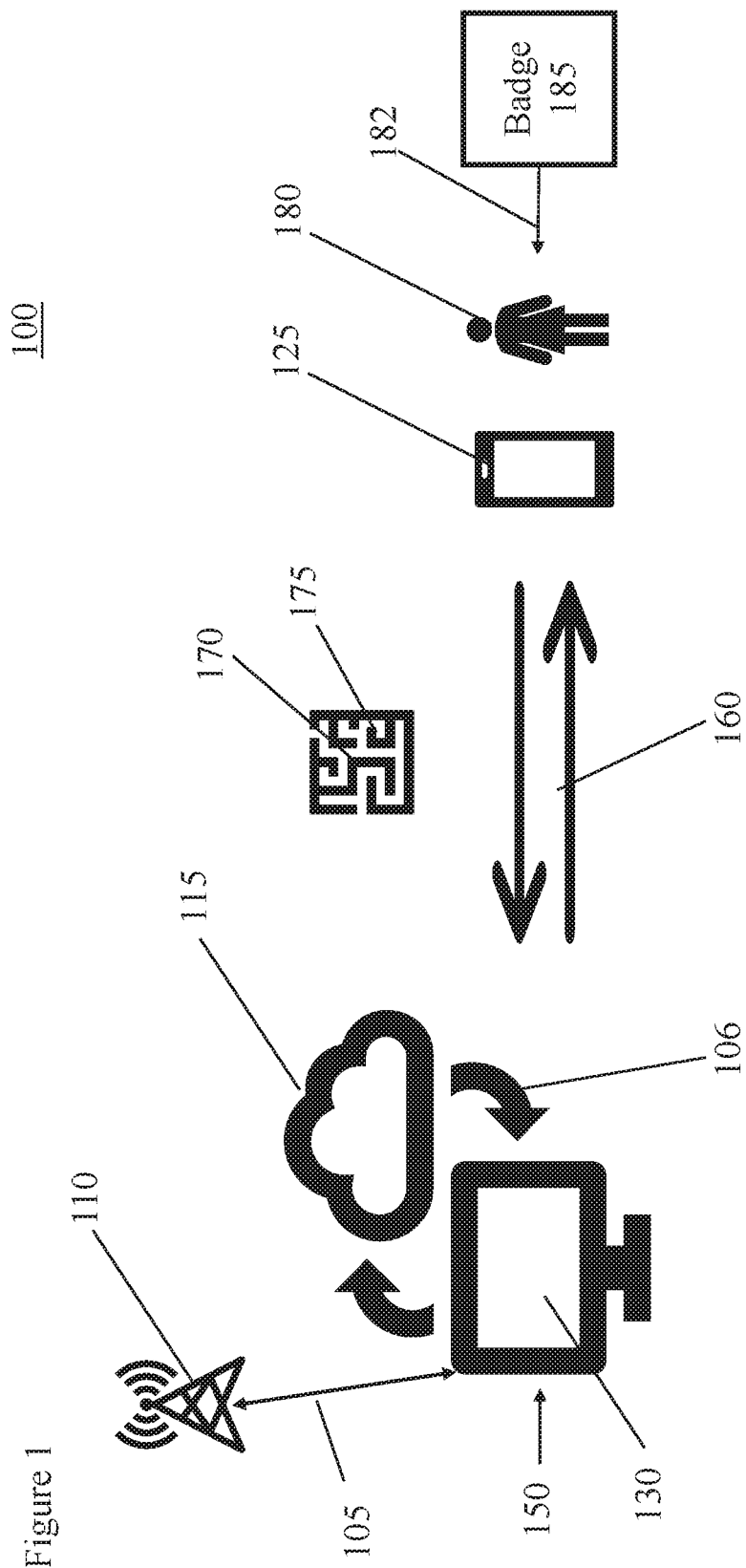
FIG. 1 is an illustration of one embodiment of the present invention showing a base station, a user, and a peripheral device like a smart phone.

It is to be understood that embodiments of the present invention are not limited to the illustrative methods, apparatus, structures, systems and devices disclosed herein but instead are more broadly applicable to other alternative and broader methods, apparatus, structures, systems and devices that become evident to those skilled in the art given this disclosure.

In addition, it is to be understood that the various features shown in the accompanying drawings are not drawn to scale, and that one or more features of a type commonly used may not be explicitly shown in any given drawing. This does not imply that the features not explicitly shown are omitted from the actual methods, apparatus, structures, systems, methods, and/or devices.

In addition, certain elements may be left out of a figure for the sake of clarity and/or simplicity when explanations are not necessarily focused on such omitted elements. Moreover, the same or similar reference numbers used throughout the drawings are used to denote the same or similar features, elements, method steps, or structures, and thus, a detailed explanation of the same or similar features, elements, method steps, or structures may not be repeated for each of the drawings.

The methods, features, apparatus, structures, systems, methods, and/or devices disclosed in accordance with embodiments of the present invention can be employed in applications, hardware, and/or electronic systems. Suitable hardware and systems for implementing embodiments of the invention may include, but are not limited to, personal computers, communication networks, electronic commerce systems, portable communications devices (e.g., feature phones or cell and smart phones), solid-state media storage devices, expert and artificial intelligence systems, functional circuitry, neural networks, etc. Systems and hardware incorporating the invention are contemplated embodiments of the invention.

It is understood that the meaning of terms might be affected by the orientation of the device described. For example, while the meaning of these descriptions might change if the device was rotated upside down, the descriptions remain valid because they describe relative relationships between features of the invention.

Many secured areas have temporary or permanent facility access devices like cards or badges 185 to enable access to the secured area 250. (These access devices 185 will be referred to as badges 185 without loss of generality). Some of these badges use radio frequency identification (RFID) chips embedded in the badge. Readers installed near a door or entry into the secured area read the RFID chips and in turn trigger an unlocking device to grant entry, e.g. open the door, for a time period to allowed access to the secured area. After the time period expires the entrance (e.g. door) is relocked.

One embodiment of the present invention is enabled by a one-time download of a smartphone application/process. The smartphone application/process can be used for all RFID enabled badges (or other access devices given to a user). No pairing of devices is required. In some embodiments, the smartphone application/process has a companion application or base station application that is enabled when dispensing of the badges at each secured area. See description below.

In some embodiments, the base station application/process identifies the Global Positioning System (GPS) coordinates defining a perimeter of the secured area (e.g. a polygon shaped perimeter) for which the badge given to a visitor/user allows access.

In some embodiments, when the visitor/user signs out a badge, the user's smartphone application/process reads/scans a code 170. Embodiments of the code include any code 170 physically or optically readable or readable from an electromagnetic signal like a quick response (QR) code, a bar code, or radio frequency signal. The code provides coordinates 175 to the smartphone application defining a secured area perimeter 225 within which the badge 185 provides access. For example, GPS coordinates of vertices of a polygon defining the secured area accessible by the badge are provided to the user's smartphone application/process. Other information 175 can be provide as described below.

In alternative embodiments, the user provides identifying information to the base station. In these embodiments, a tracking capability, e.g. embedded in the badge, provides a user position of the user/visitor to the base station system. The base station system executes a process that determines when the user position is outside of the secured area perimeter. When the user is outside the secured area perimeter and the badge has not been returned, the base station system sends an alert message to the user. The alert can be sent to the user's smartphone and/or to an alarm indication on the badge. The alert can be sent to the user alone and/or to the manager of the secured area. In alternative embodiments, the manager of the secured area is notified that the user is outside of the secured area perimeter without having returned the badge but the exact location of the user is not provided to the manager of the secured area. In some instantiations, if the user consents to having their exact location tracked, the manager of the secured area can optionally receive the user's location, e.g. the GPS coordinates of the user.

In alternative embodiments, the alert is sent out only if the distance outside the secured area perimeter exceeds a tolerance distance. The alert can take various forms that inform the user that the secured area was left without returning the badge. For example, the alert can be a text message, a smartphone vibration signal, a phone call, a notification, a display, and an e-mail.

Note that a given user/visitor may be stepping outside of the grounds with the intent to return, e.g., to go to lunch or a meeting outside the secured area. In such event the system warning can be ignored. Some embodiments provide an alert after the user is expected to leave the secured area, either temporarily or finally, if the badge is not returned. The time at which the visitor expects finally to leave the facility can be noted 175 upon signing the badge out. In these embodiments, the process executing on the base station system has logic to provide an alarm on each excursion of the user beyond the secured area perimeter and/or a final alarm when the user is beyond the secured area perimeter after the final departure time without the badge being returned. Logic for other conditions are described below.

Once the user turns in their badge, the GPS-outside-of-polygon tracker can be removed. This removal can happen in multiple ways. Scanning of the same QR code 170 that enabled the system a second time can disable the user monitoring by the base station system. In one embodiment, the smartphone application provides an indicator upon enabling the monitoring that the monitoring is enabled. Upon disabling the monitoring, the smartphone application/process can provide an indicator that the monitor is removed. Software embodiments of the system can be removed from the peripheral device as well.

Referring now to FIG. 1, an illustration is provided of one embodiment of the present invention 100 showing a base station 150. In some embodiments the base station 150 is connected (105, 106) to one or more networks, for example, a telecommunications network 110 and one or more computer networks 115, like the cloud.

The base station can include one or more general purpose computers. The base station 150 has one or more user interfaces 130, e.g. a graphical user interface (GUI) 130. Other user interfaces 130 include but are not limited to a keyboard, mouse, pointing device, voice recognition, etc. Radio frequency interfaces 130 also can be enabled to communicate 160 with peripheral devices 125 including like cell phones 125, smart phones 125, laptops 125, notebooks 125, etc.

Information 175 is exchanged 160 between the base station 150 and the peripheral devices 125 by one or more known methods. For example, information 175 can be provided to a peripheral device 125 like a smartphone 125 by the smart phone scanning a visual code 170 on a GUI. Alternatively, the information 175 can be presented in a visual code 170 like a visual image including text, bar codes, QR code, etc. In some embodiments the information 175 can be exchanged through radio frequency communication. In other embodiments, the peripheral device 125 can be connected 160 by hard wire to the base station 150.

In some embodiments, the base station 150 communicates a plurality of geographical points defining a secured area perimeter 225. (Reference FIG. 2 as well.) Typically, the geographical points are global positioning system (GPS) points, where each GPS point represents a point 205 on the secured area perimeter 225, e.g. a vertex of a geometric shape of a secured area 250 enclosed by the secured area perimeter 225. In some embodiments, a level of authorization 175 is also provided for each of two or more secured areas 250 defined by its own secured area perimeter 225. A time period of authorized access and other information 175 may also be provided to the peripheral device 125.

For example, a visitor/user 180 is visiting a building with multiple floors. The visitor/user 180 is permitted to visit the second floor of the building on Wednesday between the hours of 3 to 5 PM. The base station 150 can provide the user's 180 smartphone 125 four GPS points 205, each GPS point corresponding the position of one corner 205 of the rectangular 225 building. In addition, the base station 150 will provide the restrictive information 175 about access only permitted on the second floor between 3 to 5 PM on Wednesday.

Information 175 may be provided from the user 180 to the base station 150 as well. In some embodiments, the user 180 provides permissions for the system 100 to track/monitor the position of the user 180 if the user is outside of the secured area perimeter. In some embodiments, the user 180 might be required to grant this permission in order to gain access to the secured area 250. The user 180 might also provide information 175 like times the user 180 will not be in the secured area, e.g. lunch time, and/or the final time that user 180 expects to leave the secured area.

The peripheral device 125, e.g. a smartphone 125, has one or more memories, one or more central processing units (CPUs), one or more user interfaces. The user interfaces can receive and send information 175. For example, an image recognition system, like a camera, can receive information 175 encoded in a visual code 170. The peripheral device 125 also has an interface to receive positional data, e.g. GPS position of the user 180.

Figure 2:
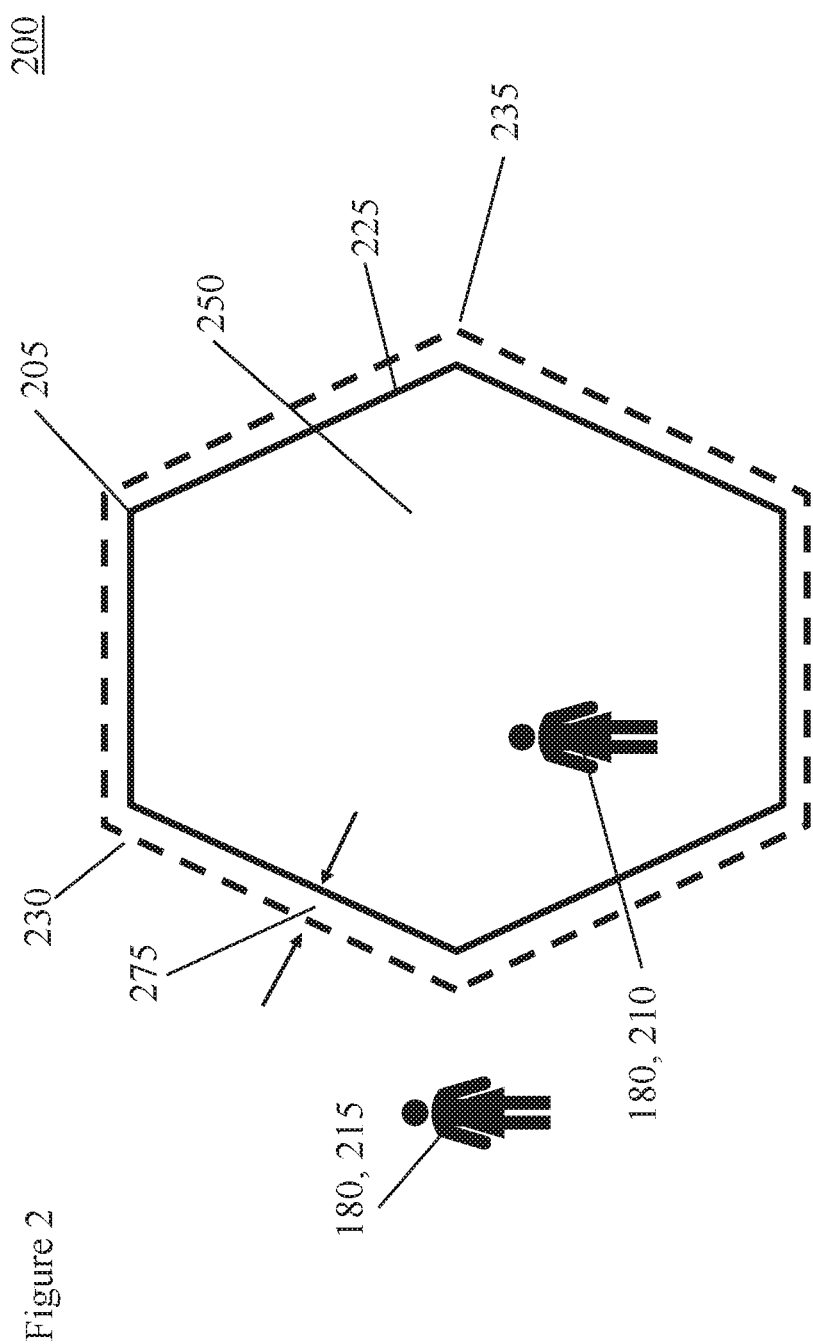
FIG. 2 is an illustration showing a secured area, a secured area perimeter, and a tolerance distance.

FIG. 2 is an illustration 200 showing a secured area 250, a secured area perimeter 225, and a tolerance distance 275 between the secured area perimeter 225 and a tolerance perimeter 230.

One user 180 is a user 210 within the tolerance perimeter 230. Another user 180 is a user 215 outside of the tolerance perimeter 230.

In some embodiments, the secured area perimeter 225 and the tolerance perimeter 230 are defined as polygonal shapes with three or more vertices (205, 235). Secured areas 250 that are not polygonal in shape can be defined approximately as a polygonal shape 225 in which the secured area 250 is inscribed. This this case the tolerance distance 275 will not be constant.

Figure 3:
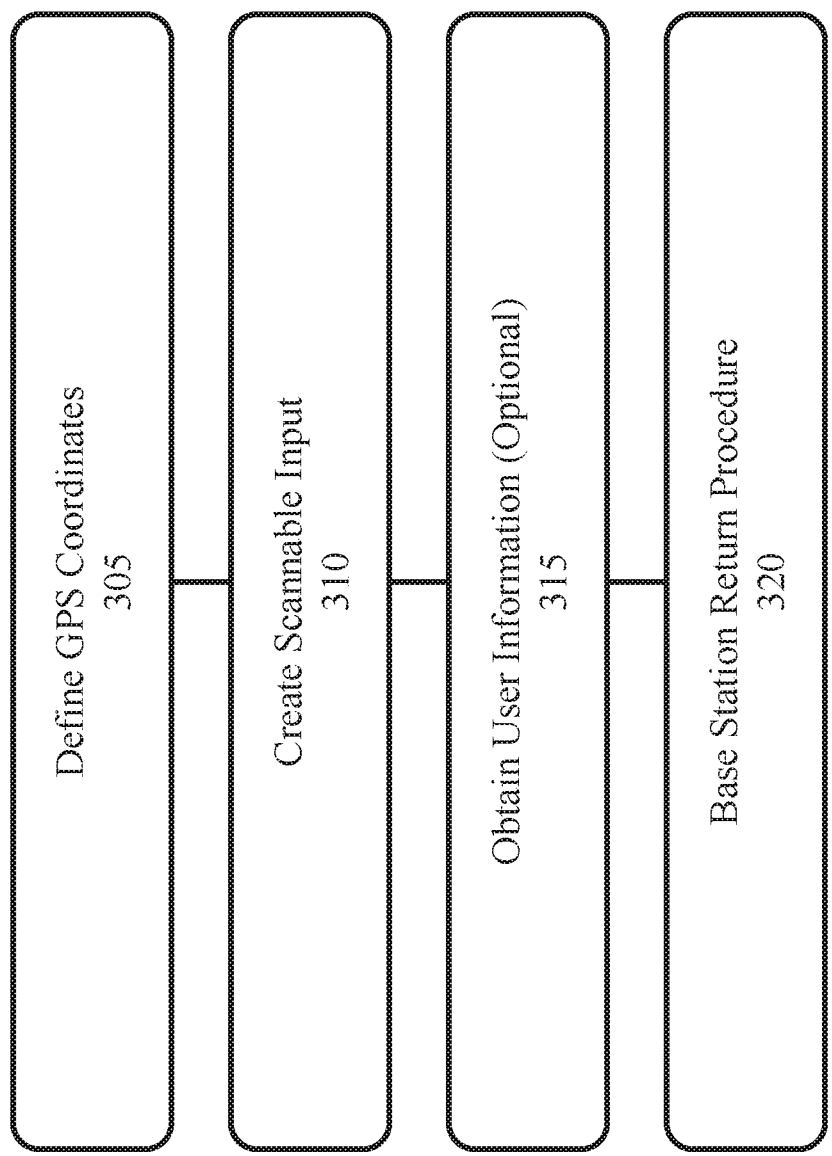
FIG. 3 is a flow chart showing the steps of a user registration/deregistration and operation process, typically performed by the base station and/or related system.

FIG. 3 is a flow chart showing the steps of a user registration/deregistration and operation process 300. Typically, most of this process 300 is performed by the base station 150.

In step 305, the GPS coordinates of the secured area perimeter 225 are defined. In some embodiments, the GPS coordinates 305 are the GPS position of each of the vertices (205, 235) of the polygonal shape defining the secured area perimeter (225, 230).

Additional information 175 can be defined in this step. For example, the tolerance perimeter 230 is also defined. The entity controlling access to the secured area 250 can determine a policy defining how far away a user 180 is permitted to be outside of the secured area perimeter 225. Values can be added to the GPS coordinates 305 of the secured area perimeter 225 to define the vertices 235 (tolerance perimeter vertices 235) of the tolerance perimeter 230. The tolerance distance 275 can be dependent on user 180 classification, date, time of day, weather conditions, or other conditions 175. For example, a tolerance distance 275 for a co-worker from a different location might be larger than a tolerance distance 275 given to an outside vendor.

Other information 175 can be defined in step 305. For example, one or more security levels or permission levels can be established for each of the secured areas 250. Times and other conditions of access can also be established for each of the secured areas 250. Classification of user 180 can be determined and if this classification affects the security or permission levels, tolerance perimeter 230, secured area perimeter 225, etc.

In step 310, the information 175 defined in step 305, e.g. the GPS coordinates etc., is coded into a scannable input 170 that can be read by one or more peripheral devices 125.

Step 315 is an optional step where the base station gathers information from the user 180. Information gathered in step 315 includes but is not limited to times the user 180 will be in the secured area(s) 250, final departing time, dates the user will be in the secured area(s) 250, classification information about the user 180, whether or not the user will permit being tracked outside of the secured area(s) 250, times the user 180 will leave one of the secure areas 250 with the intent to return, etc.

At this point in some embodiments, the user 180 is given 182 a badge 185. See FIG. 1. In some embodiments, the badge 185 has the capability of receiving GPS information about the position of the user 180, performing logical functions as described below, and, in some cases, communicating information with the base station 150.

In step 320, the process 300 verifies the user 180 has left all secured areas 250 and does not intend to return under this registration, e.g. a final access time has passed. In addition, the user 180 has turned in their badge 185. Upon completion of all these conditions, in some embodiments, step 320 de-registers the user 180 and optionally stores information about the user 180 access to the secured area(s) 250. In some embodiments, a signal is sent to the user's 180 peripheral device 125 to deactivate the any associated processes, e.g. process 500 below.

Figure 4:
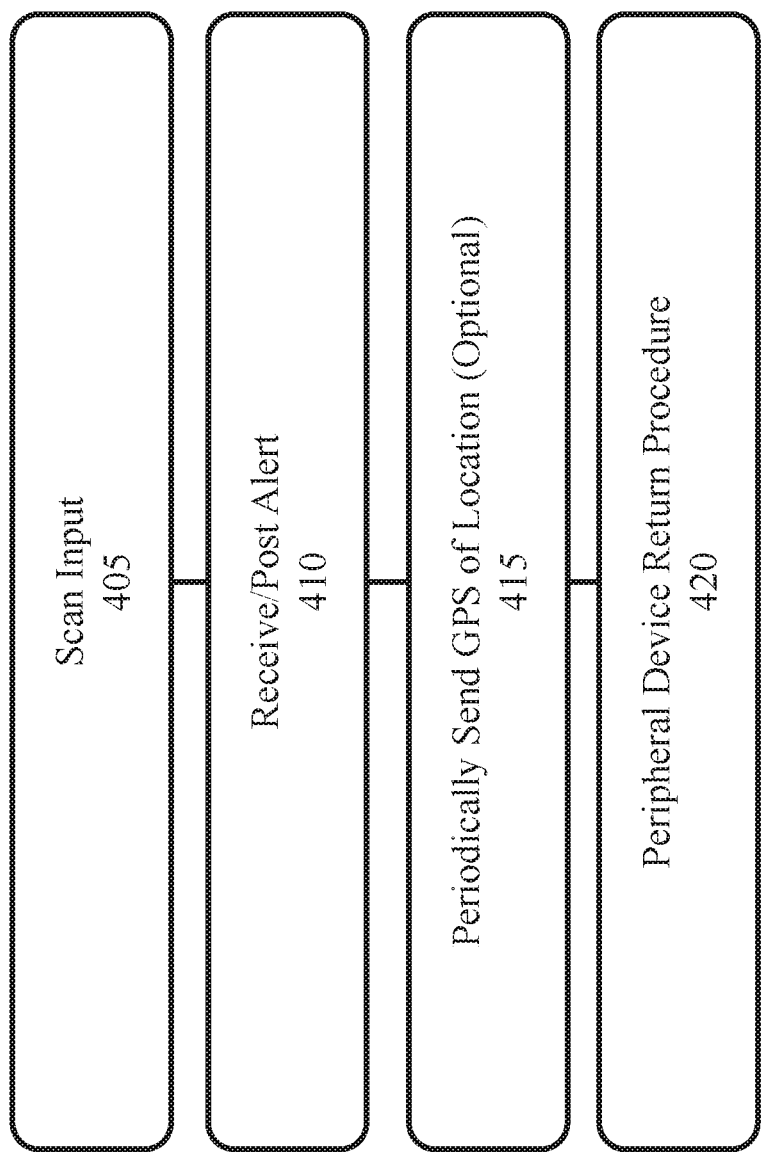
FIG. 4 is a flow chart showing the steps of a user registration/deregistration and operation process performed by the peripheral device.

FIG. 4 is a flow chart showing the steps of a user registration/deregistration and operation process 400 performed by the peripheral device 125.

In step 405, the peripheral device 125, e.g. a smartphone 125, scans the code 170 that contains the information 175 the peripheral device 125 will need to perform the logic (e.g. described in FIG. 5) to determine whether the user 180 (device 125) is outside 215 of the secured area perimeter 225. In some embodiments, other information 175 is provided, as described above. For example, the code 170 can provide information 175 including but not limited to the tolerance perimeter 230, times and/or dates of access, levels of permission, classification of user 180 access for a given secured area 250, etc.

As described above, the peripheral device 125 access the information by a variety of ways including scanning a visual code 170, receiving a radio frequency or infrared signal, hard wire connection, etc.

In step 410, the peripheral device 125 receives and/or posts alerts 410 to the user 180. The peripheral device 125 can post alerts by performing logic as describe in one embodiment presented in process 500 below. Alternatively, the base station 150 or another computer system 100 can perform logic, as the example embodiment shown in process 600 below, and send the alert for the peripheral device to receive 410.

As an option, and sometimes if the user 180 grants permission, the peripheral device 125 sends GPS location information of the user 415 to the base station 150.

Step 420 is a procedure that deletes and/or disables information and processes on the peripheral device after the user 180 leaves the secured area(s) 250 and returns the badge 285.

Figure 5:
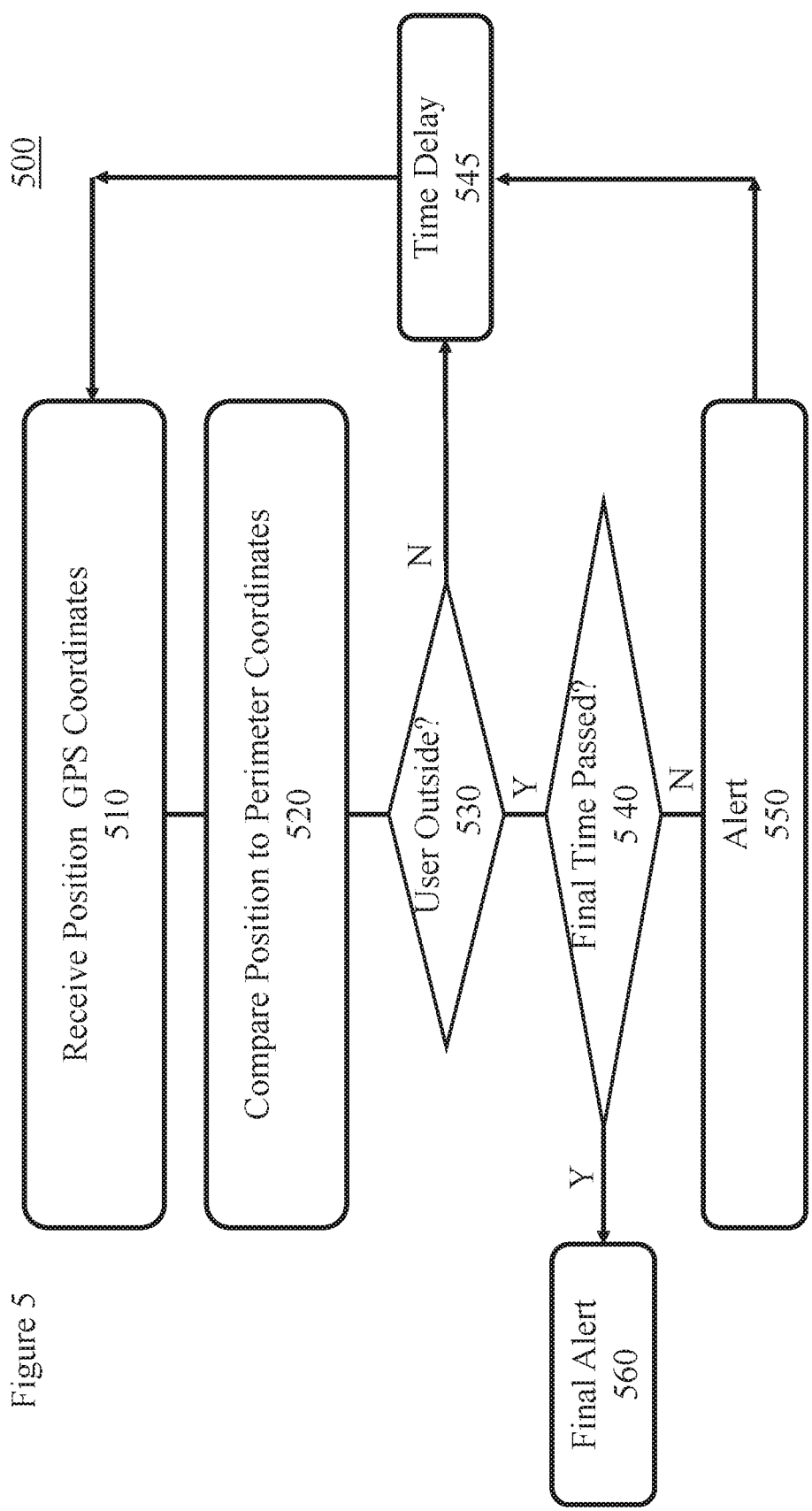
FIG. 5 is a flow chart showing the steps of one embodiment of an alert process performed by the peripheral device, e.g. a smartphone.

FIG. 5 is a flow chart showing the steps of one embodiment of an alert process 500 performed by the peripheral device 125, e.g. a smartphone 125.

Step 510 begins with the peripheral device 125 receiving information like GPS coordinates defining the secured area(s) 250 and/or the tolerance perimeter 230 as described above, e.g. in step 305.

In step 520, the peripheral device determines the user location. In some embodiments, the user location is the GPS coordinates of the position/location at a given time as determined by the peripheral device 125.

The GPS coordinates of the user location are compared with the GPS coordinates in the secured area(s) 250, i.e. within the secured area perimeter 225 and/or the tolerance perimeter 230.

The determination of whether the user's GPS coordinates are within the polygon defined by the GPS coordinates of the vertices of the tolerance perimeter can be based on standard Point-in-Polygon algorithms [see K. Hormann and A. Agathos, "The point in polygon problem for arbitrary polygons", Computational Geometry 20: 131-144, 2001].

In step 530, based on the comparison in step 520, the process 500 determines whether the user 180 is inside the secured area 250 or outside the secured area 250 (or outside the tolerance perimeter 230).

If the user 180 is inside, the process 500 delays for a time delay 545 and steps 510, 520, and 530 are repeated. In some embodiments the time delay is between 1 and 60 seconds or any time thought to be short enough to account for changes in the user 180 location.

In alternative embodiments, steps 520 and 530 can perform other or additional comparisons. For example, these steps can determine whether certain conditions are met. Conditions include whether the user 180 has the appropriate security classification, and/or if the user is in the secured area 250 on the correct date and/or at the correct time. If these conditions are not met, the user 180 might be required to return the existing badge 185 and re-register for a new badge 185.

If the user 180 is outside the secured area 250, step 540 determines whether the final departure time for the user 180 has passed and/or another condition has not satisfied. If the final departure time has not passed (and/or all conditions are satisfied), an alert is posted 550 by the peripheral device 125 alerting 550 the user 180 that they are outside of the secure area 250 without returning their badge 185.

The process 500 then delays for a time delay 545 and repeats the process 500 from step 510. In this case, the time delay can is longer than the one used after step 530. For example, the time delay after step 550 might be from 30 to 90 minutes, e.g. to allow for a lunch break away from the secured area 250.

If the final departure time has passed 540 (and/or some condition is not satisfied), a final alert 560 can be sent. This final alert 560 indicates access to the secure area 250 is terminated, the badge 185 has not been returned, and the user 180 should return the badge 185 (and/or re-register is a condition is not satisfied).

In some embodiments, once the badge 185 is returned, process 500 is deleted or turned off 420.

Figure 6:
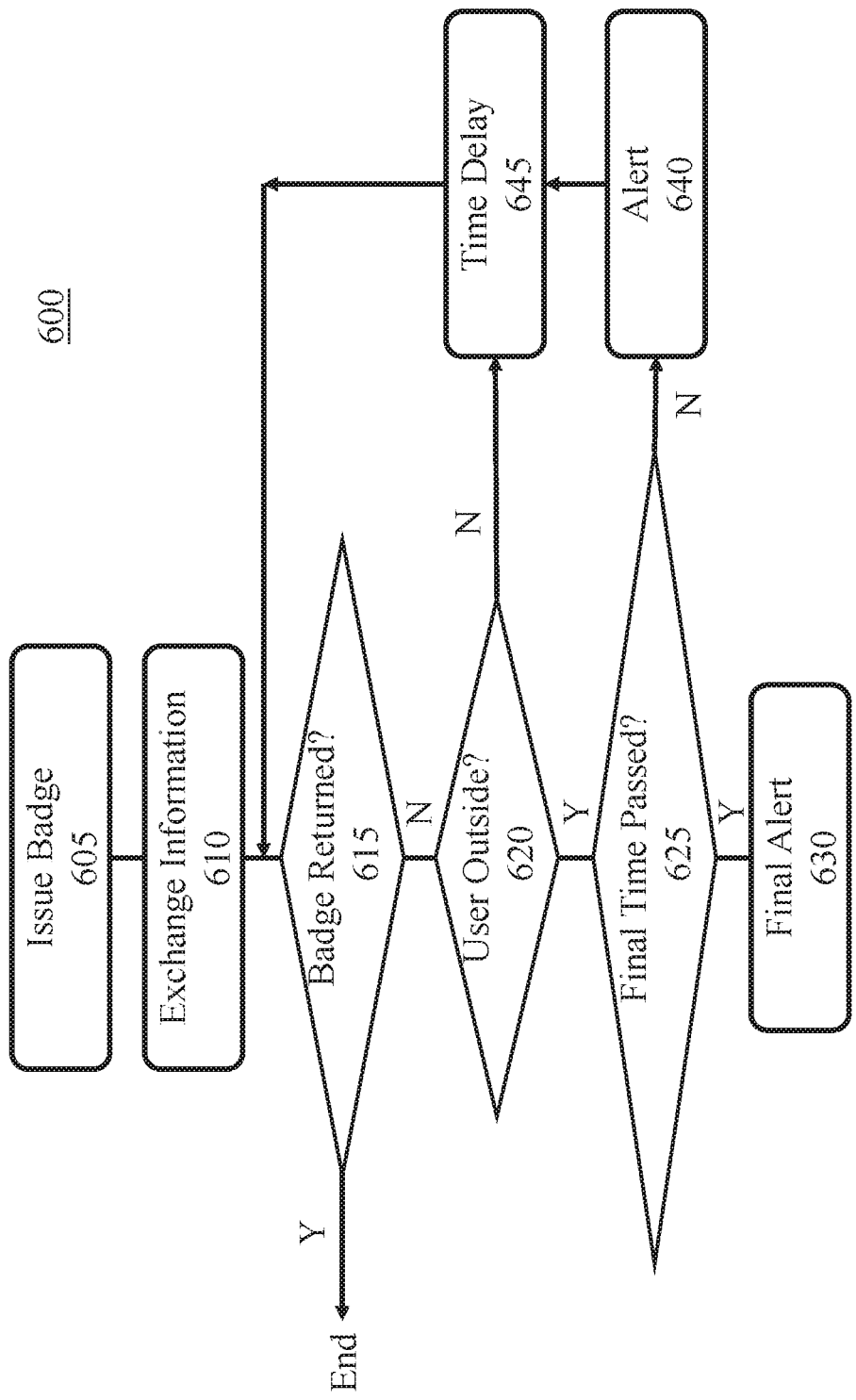
FIG. 6 is a flow chart showing the steps of one embodiment of an alert process performed by the base station.

FIG. 6 is a flow chart showing the steps of one embodiment of an alert process 600 performed by the base station 150.

In step 605, the process 600 issues the badge 185 to the user 180.

In step 610, the process 600 exchanges information 175 with the user 180 as defined above, e.g. in steps 310 and 315. Note that step 605 can be performed after step 610.

Step 615 determines if the badge 185 is returned. If the badge 185 is returned, the process ends. At this point the base station returns to procedure 320 and/or the peripheral device return procedure 420 can be performed.

If the badge 185 is not returned, step 620 determines if the user 180 is outside the secured area(s) 250. If the user 180 is not outside the secured area(s), the process delays for a time delay 645 and begins again at step 615. In some embodiments, this time delay is between 1 and 60 seconds or any time short enough to account for changes in the user 180 location.

If the user 180 is outside the secured area(s) 620, step 625 determines if the final departure time has passed for the user 180 (and/or if another condition is not met).

If the final departure time has not passed (and all conditions are met) 625, an alert 640 is sent to the peripheral device 125 informing the user 180 that they are out of the secured area(s) 250 and have not turned in the badge 185. The alert 640 can be a text message, a recorded phone call, an alarm, etc.

The process then delays for a time delay 645 and returns to step 615. In this case the time delay 645 might be between 30 to 90 minutes, e.g. to allow for a lunch break away from the secured area 250.

If the final departure time has passed (or another condition is not met) 625, a final alert 630 is sent. This final alert 640 informs the user that access to the secure area 250 is terminated and the badge 185 has not been returned. (If a condition is not met, the user 180 may have to return the badge 185 and re-register.)

In some embodiments, once the badge 185 is returned, process 600 is deleted or turned off 420 for the user 180 in question.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The terminology used herein was chosen to explain the principles of the embodiments and the practical application or technical improvement over technologies found in the marketplace or to otherwise enable others of ordinary skill in the art to understand the embodiments disclosed herein. Devices, components, elements, features, apparatus, systems, structures, techniques, and methods described with different terminology that perform substantially the same function, work in the substantial the same way, have substantially the same use, and/or perform the similar steps are contemplated as embodiments of this invention.

We claim:

1. A peripheral device comprising:
   one or more memories, one or more central processing units (CPUs), and one or more user interfaces, the user interfaces capable of sending and receiving information; and
   a process executed by the one or more CPUs that i. receives geometric information defining a secured area perimeter of a secure area from the one or more user interfaces; ii. receives user position information from a global positioning system (GPS) through the one or more interfaces, iii. compares the security perimeter to the position information to determine whether or not a user is within the secured area and takes some action when the user is deemed to be outside the secure area and an access device to the secure area is not returned, wherein the process is removed from the peripheral device or stops executing on the one or more CPUs when a user returns the access device.

2. The peripheral device, as in claim 1, where the process posts an alert to the user on the one or more user interfaces when the user is deemed to be outside the secure area.

3. The peripheral device, as in claim 2, where the process is enabled when the user has possession of the access device and the alert is only sent when the user has not returned the access device.

4. The peripheral device, as in claim 3, where the access device is one or more of the following: a badge, a temporary identification, and a radio frequency identification (RFID) device.

5. The peripheral device, as in claim 1, that is a smart phone.

6. The peripheral device, as in claim 1, where the geometric information is received by the peripheral device by the one or more user interfaces when an access device is given to the user.

7. The peripheral device, as in claim 1, where the geometric information further comprises a tolerance perimeter information.

8. The peripheral device, as in claim 7, where the tolerance perimeter information describes a tolerance perimeter a tolerance distance outside of the secured area perimeter.

9. The peripheral device, as in claim 1, where the secured area perimeter is in the shape of a polygon and the geometric information are GPS coordinates of one or more vertices of the polygon.

10. The peripheral device, as in claim 1, where the process further receives information from the one or more user interfaces about a final time the user is to leave the secured area.

11. The peripheral device, as in claim 10, where the process sends the final alert to the user through the one or more user interfaces after the final time if an access device is not returned, the final alert indicating the user has left the secured area without returning the access device.

12. The peripheral device, as in claim 1, where the process further receives other information through the one or more user interfaces about one or more conditions, the conditions including one or more of the following: a security level for the secured area, a classification of the user, a time of allowed access to the secured area, and a date of allowed access to the secured area.

13. The peripheral device, as in claim 12, where if one or more of the conditions is not met and an access device is not returned, an alert is sent to the user.

14. The peripheral device, as in claim 1, where the geometric information is received by the peripheral device by one or more of the following: a radio frequency signal, a hard wire connection, a one time reading of a visual code, a one time scan, a one time reading of a bar code, and a one time reading of a quick response (QR) code, and a text.

* * * * *